US011553030B2

(12) United States Patent
Ray et al.

(10) Patent No.: US 11,553,030 B2
(45) Date of Patent: Jan. 10, 2023

(54) SERVICE WORKER CONFIGURED TO SERVE MULTIPLE SINGLE PAGE APPLICATIONS

(71) Applicant: MICROSOFT TECHNOLOGY LICENSING, LLC, Redmond, WA (US)

(72) Inventors: Aninda Ray, Sammamish, WA (US); Dennis Joel David Myren, Seattle, WA (US); Isha Verma, Bothell, WA (US); Zhi Liu, Bellevue, WA (US); Zhenguang Chen, Bellevue, WA (US); John D. Fan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 85 days.

(21) Appl. No.: 16/944,842

(22) Filed: Jul. 31, 2020

(65) Prior Publication Data
US 2021/0377332 A1 Dec. 2, 2021

Related U.S. Application Data

(60) Provisional application No. 63/033,147, filed on Jun. 1, 2020.

(51) Int. Cl.
*H04L 67/02* (2022.01)
*G06F 16/955* (2019.01)
(Continued)

(52) U.S. Cl.
CPC ........ *H04L 67/02* (2013.01); *G06F 16/90344* (2019.01); *G06F 16/9566* (2019.01); *H04L 45/54* (2013.01); *H04L 69/22* (2013.01)

(58) Field of Classification Search
None
See application file for complete search history.

(56) References Cited

U.S. PATENT DOCUMENTS 8,438,289 B1    5/2013  Grieve et al.
9,774,572 B2 *  9/2017  Mason ............... G06F 16/9566
(Continued)

FOREIGN PATENT DOCUMENTS

CA    2782674 A1 *  6/2010  ........... G06F 15/167
CA    2786887 A1 *  8/2010  ........... G06F 15/177
(Continued)

OTHER PUBLICATIONS

Elsaadawy et al., "Enabling efficient application monitoring in cloud data centers using SDN", Feb. 28, 2019, arXiv:1902.11292, https://doi.org/10.48550/arXiv.1902.11292, Sections 4 and 5 (Year: 2019).*

(Continued)

*Primary Examiner* — Davoud A Zand
(74) *Attorney, Agent, or Firm* — Newport IP, LLC; Jacob P. Rohwer

(57) ABSTRACT

Disclosed herein is a system configured to implement a service worker capable of serving multiple single page applications (SPAs) that are hosted in the same uniform resource locator (URL) space (e.g., a domain within which the SPAs are hosted). Accordingly, the defined scope of the service worker is no longer bound by only one SPA, but rather by a root directory of a web site that hosts multiple SPAs. Since the service worker described herein serves multiple SPAs, the service worker implements an approach to ensure that a correct application controller corresponding to the SPA that hosts a URL is invoked. To do this, the service worker is configured to leverage a router and a routing table to associate a URL included in a request from a browser with the correct application controller correspond- (Continued)

ing to the SPA that hosts the URL for which the request is sent.

15 Claims, 8 Drawing Sheets

(51) Int. Cl.
*H04L 69/22* (2022.01)
*G06F 16/903* (2019.01)
*H04L 45/00* (2022.01)

(56) References Cited

U.S. PATENT DOCUMENTS

| | | | |
|---|---|---|---|
| 9,967,309 B2 | 5/2018 | Brown et al. | |
| 10,496,381 B2 | 12/2019 | Seksenov et al. | |
| 10,652,087 B2* | 5/2020 | Varney | H04L 41/0813 |
| 10,958,662 B1* | 3/2021 | Sole | H04L 63/105 |
| 2014/0173088 A1* | 6/2014 | Varney | G06F 9/5055 |
| | | | 709/224 |
| 2016/0080280 A1* | 3/2016 | Ramachandran | H04L 45/125 |
| | | | 370/235 |
| 2016/0100030 A1 | 4/2016 | Brown et al. | |
| 2017/0034306 A1 | 2/2017 | Thangeswaran | |
| 2019/0065217 A1 | 2/2019 | Girdhar et al. | |

FOREIGN PATENT DOCUMENTS

| | | | | |
|---|---|---|---|---|
| CA | 3060362 A1 * | 2/2019 | | G06F 16/252 |
| WO | 2018149395 A1 | 8/2018 | | |

OTHER PUBLICATIONS

"International Search Report and Written Opinion issued in PCT Application No. PCT/US21/023551", dated Jun. 21, 2021, 12 Pages.
"Add to Home screen", Retrieved from: https://web.archive.org/web/20190922205303/https:/developer.mozilla.org/en-US/docs/Web/Progressive_web_apps/Add_to_home_screen, Sep. 22, 2019, 11 Pages.
"Cache", Retrieved from: https://web.archive.org/web/20200414115832/https:/developer.mozilla.org/en-US/docs/Web/API/Cache, Apr. 14, 2020, 12 Pages.
"Fetch", Retrieved from: https://web.archive.org/web/20200423220118/https:/fetch.spec.whatwg.org/, Apr. 23, 2020, 84 Pages.
"IHttpModule Interface", Retrieved from: https://web.archive.org/web/20190522173808/https:/docs.microsoft.com/en-us/dotnet/api/system.web.ihttpmodule?view=netframework-4.8, May 22, 2019, 2 Pages.
"IndexedDB API", Retrieved from: https://web.archive.org/web/20200303114823/https:/developer.mozilla.org/en-US/docs/Web/API/IndexedDB_API, Mar. 3, 2020, 8 Pages.
"Introduction to Service Worker", Retrieved from: https://web.archive.org/web/20200118004823/https:/developers.google.com/web/ilt/pwa/introduction-to-service-worker, Jan. 18, 2020, 8 Pages.
"Progressive web apps (PWAs)", Retrieved from: https://web.archive.org/web/20200229191645/https:/developer.mozilla.org/en-US/docs/Web/Progressive_web_apps, Feb. 29, 2020, 4 Pages.
"Pwastats", Retrieved from: https://web.archive.org/web/20200319105506/https:/www.pwastats.com/, Mar. 19, 2020, 3 Pages.
"Service Worker API", Retrieved from: https://web.archive.org/web/20200417074653/https:/developer.mozilla.org/en-US/docs/Web/API/Service_Worker_API, Apr. 17, 2020, 9 pages.
"StorageQuota", Retrieved from: https://web.archive.org/web/20191205113734/https:/developer.mozilla.org/en-US/docs/Web/API/StorageQuota, Dec. 5, 2019, 5 Pages.
"Streams API", Retrieved from: https://web.archive.org/web/20200106130303/https:/developer.mozilla.org/en-US/docs/Web/API/Streams_API, Jan. 6, 2020, 14 Pages.
"Web app manifests", Retrieved from: https://web.archive.org/web/20160320024039/https:/developer.mozilla.org/en-US/docs/Web/Manifest, Mar. 20, 2016, 14 Pages.
"workbox", Retrieved from: https://web.archive.org/web/20200417221035/https:/developers.google.com/web/tools/workbox, Apr. 17, 2020, 9 Pages.
"Workbox Navigation Preload", Retrieved from: https://web.archive.org/web/20191207075416/https:/developers.google.com/web/tools/workbox/modules/workbox-navigation-preload, Dec. 7, 2019, 3 Pages.
Archibald, Jake, "Speed up Service Worker with Navigation Preloads", Retrieved from: https://web.archive.org/web/20170430114232/https:/developers.google.com/web/updates/2017/02/navigation-preload, Apr. 30, 2017, 8 Pages.
Caplin, Mark J., "Developing a Large Scale Application with a Single Page Application (SPA) using AngularJS", Retrieved from: https://www.codeproject.com/Articles/808213/Developing-a-Large-Scale-Application-with-a-Single, Aug. 31, 2014, 31 Pages.
Dumitru, Catalin, "Dynamic Page Assembly using Service Workers", Retrieved from: http://colin-dumitru.github.io/service-workers/tutorial/2014/12/14/dynamic-page-assembly.html, Dec. 14, 2014, 9 Pages.
Losoviz, Leonardo, "Implementing a Service Worker for Single-Page App WordPress Sites", Retrieved from: https://www.smashingmagazine.com/2017/10/service-worker-single-page-application-wordpress-sites/, Oct. 11, 2017, 55 Pages.
Richard, et al., "What makes a good Progressive Web App?", Retrieved from: https://developers.google.com/web/progressive-web-apps/checklist#baseline, Jan. 6, 2020, 6 Pages.

* cited by examiner

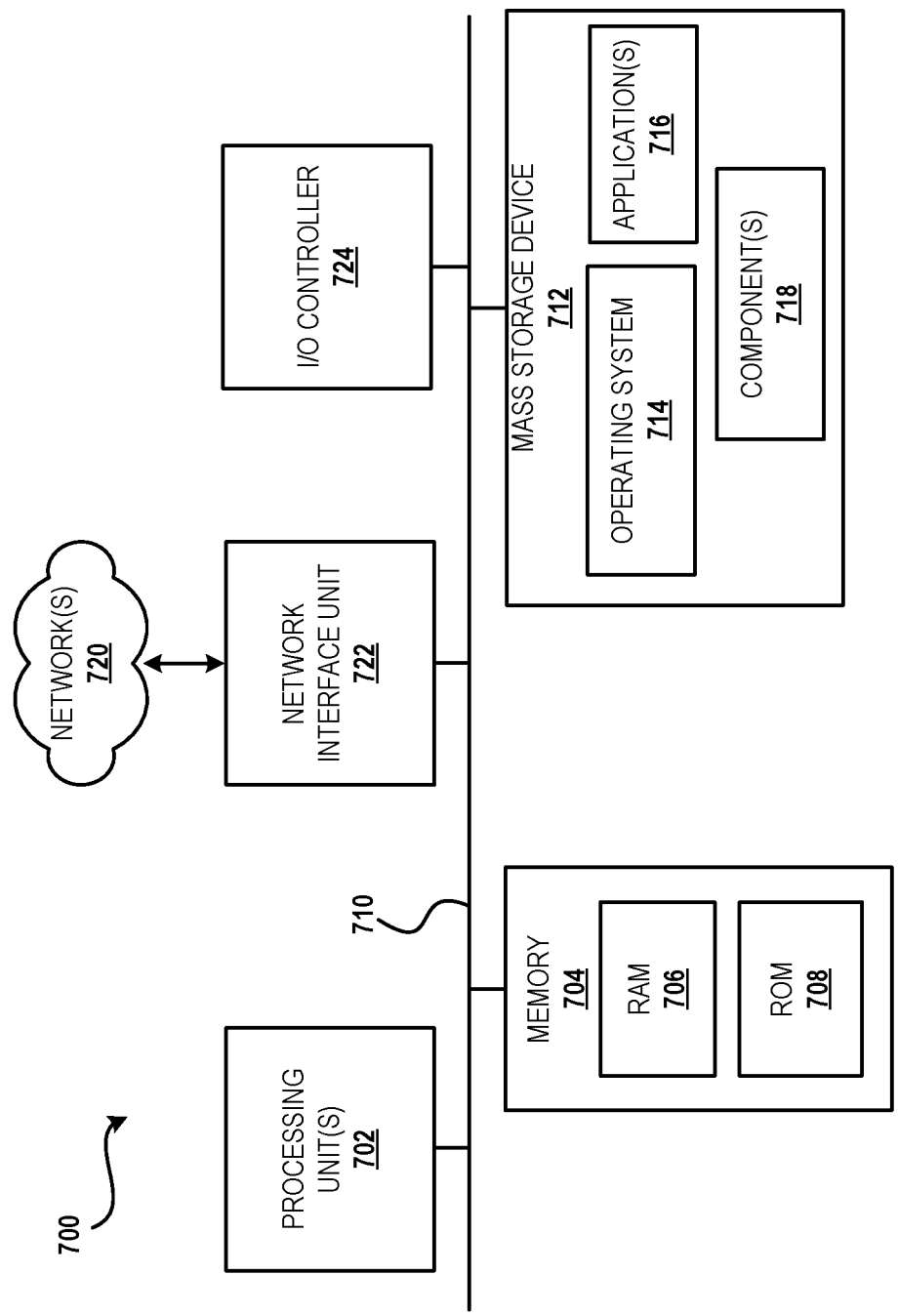

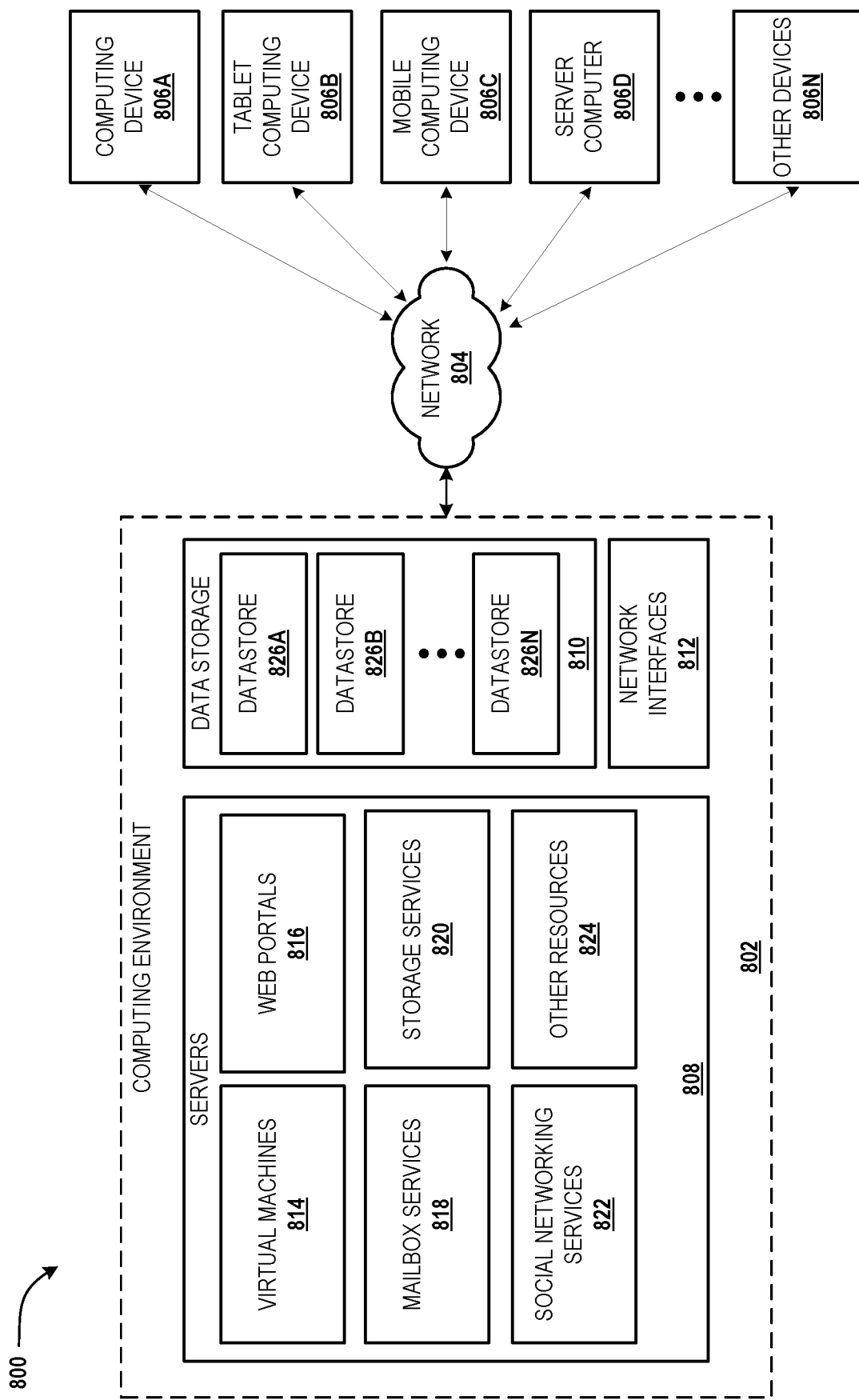

SERVICE WORKER CONFIGURED TO SERVE MULTIPLE SINGLE PAGE APPLICATIONS

PRIORITY APPLICATION

This application claims the benefit of and priority to U.S. Provisional Application No. 63/033,147, filed Jun. 1, 2020, the entire contents of which are incorporated herein by reference.

BACKGROUND

A single page application (SPA) is a web application that interacts with a browser to write data to a web page without requiring the loading of an entire web page. Via the use of a single page application, code (e.g., Hyper-Text Markup Language (HTML), JavaScript, Cascading Style Sheets (CSS)) for a web page can be retrieved by the browser via local files stored on a device executing the browser. That is, a user device has the ability to initially download a single page application from a network server and subsequently execute the file(s) from local storage without having to depend on a network connection to a network server (e.g., client-side rendering).

A service worker is a programmable network proxy configured between the browser and the network server. The service worker is capable of intercepting requests from the browser and enabling communications with a single page application stored locally on the device. More specifically, a service worker is a script that a browser executes in the background, separate from execution of a web page, which allows a single page application to independently control the handling of network requests for the web page without having a network dependency. Use of a service worker allows the browser, and therefore the user device, to reduce the runtime latency, improve end-user perceived latency, and reduce the network dependency.

Traditionally, a service worker is bound to a specific single page application. In other words, a service worker is dedicated to a lone single page application resulting in a conventional one-to-one association between a service worker and a single page application. Accordingly, a user device needs to expend the resources (e.g., memory and compute units) to execute multiple service workers when a browser is rendering web pages for multiple single page applications. In many scenarios, these multiple single page applications are hosted against the same root scope. A root scope may correspond to an online service domain (e.g., 'www.contoso.com') that hosts different single page applications (e.g., 'mail.contoso.com' and 'calendar.contoso.com').

Execution of multiple service workers for multiple single page applications that are hosted against the same root scope results in additional resource use because service workers have to be unregistered and reregistered as a user switches from using one single page application to another. This process of unregistering and reregistering service workers ultimately has a severe impact on the boot time of the single page applications.

Furthermore, a traditional service worker is configured to make a deterministic association between a uniform resource locator (URL) of a web page being executed by the browser and a single page application. A traditional service worker is not configured to handle a dynamic URL where there is no deterministic association between a URL and a single page application. A dynamic URL is one that can refer to pages of different single page applications depending on settings defined by a tenant. For instance, one tenant of a cloud service provider may configure a search application to be served from 'www.contoso.com', while another tenant of the cloud service provider may configure a mail application to be served from the same URL—'www.contoso.com'. Consequently, the one-to-one deterministic approach is not compatible with dynamic URLs because a traditional service worker does not know whether a dynamic URL is deterministically associated with the single page application to which the service worker is dedicated.

It is with respect to these and other considerations that the disclosure made herein is presented.

SUMMARY

The disclosed techniques provide a service worker that is capable of serving multiple single page applications (SPAs) that are hosted in the same uniform resource locator (URL) space (e.g., a domain within which the multiple single page applications are hosted). Accordingly, the defined scope of the service worker is no longer bound by only one single page application, but rather the defined scope for the service worker is a root directory of a web site (e.g., 'www.contoso.com') that hosts multiple single page applications (e.g., a calendar single page application, a mail single page application, a search single page application, etc.). Via use of the techniques described herein when the user switches, in the browser, from using one single page application to using another (e.g., the user clicks on a link in a calendar application to access a mail application in the same root directory), the browser no longer needs to unregister and reregister separate service workers because a common service worker that serves both single page applications is already registered and executing.

As described herein, a browser of a user device is configured to download and/or install a service worker and multiple single page applications upon a first access to a web page (e.g., a home page or welcome page) included in the root directory that defines the scope for the service worker. The browser is configured to register the service worker. Each of the multiple single page applications comprises an application controller. Via the use of an application controller, a single page application has the capability to define its own offline experience (e.g., a boot sequence) without having to access or receive files and/or instructions from a network server. Rather, as part of a service worker package, an application controller downloads files and enables subsequent access to data stores pertinent to the single page application it serves. Providing developers of a single page application with the flexibility to control offline scenarios is important because different single page applications may handle the loading and/or syncing of content differently in order to optimize a user experience. Accordingly, while the service worker described herein is configured to serve multiple single page applications, the service worker enables different experiences to be executed via separate application controllers associated with the single page applications.

An application controller is configured to manage the service worker life cycles and provide various operations based on the life cycles. For example, via the use of an application handler, an application controller can cause a navigation request, such as a fetch event, to be implemented for a single page application. In another example, via the use of an application handler, an application controller can cause dynamic Hyper Text Markup Language to be dynamically rendered using a streamed response. In yet another example, via the use of an application configuration, an application controller can provide access to runtime configuration data stored in local data stores. Further, life cycle operations can include an install operation, an activate operation, a request handling operation, a sync operation, a message operation, etc.

Since the service worker described herein serves multiple single page applications, the service worker implements an approach to ensure that a correct application controller corresponding to the single page application that hosts a URL is invoked. To do this, the service worker is configured to leverage a router and a routing table to associate a URL included in a request from the browser with the correct application controller corresponding to the single page application that hosts the URL of the web page for which the request is sent. As described above, the URL is hosted within a root directory that defines the scope for the service worker.

In various examples described herein, the URL can be a dynamic URL that can be associated with different ones of the single page applications served by the service worker, in accordance with user-driven settings defined in tenant accounts. Moreover, within a particular tenant organization, a dynamic URL can change the page to which it refers over time. In other examples described herein, the URL can be a static URL that is associated with that same single page application, regardless of any user-driven settings defined in tenant accounts.

The router is configured to determine whether a match exists between part of a URL and an entry stored in the routing table. In various examples, the match is based on a route path, which is a URL relative to a host name with the query string removed. In other words, the route path is the remaining portion of the URL after the host name and the query string are removed. Using route paths, rather than whole URLs, optimizes the process for determining matches and reduces the chance of error as the system compares shorter strings. The route path is normalized (e.g., includes only lower case letters) to ensure effective and efficient matching. In accordance with dynamic URLs and static URLs, a route path can be a dynamic route path or a static route path. In case of a match (e.g., a cache hit), the service worker is configured to use the entry to identify a single page application to which the route path refers and invoke a corresponding application controller for the single page application.

There are various ways in which the service worker populates the routing table with entries. For example, static URLs (e.g., static route paths) can be loaded into the routing table when an application controller is downloaded and/or installed. The application controller for a single page application can include a property that defines static URLs that belong to the single page application. Since the pages to which static URLs refer are consistent across tenant accounts (i.e., they are not driven by user or tenant defined settings), entries based on these static URLs can be added to the routing table immediately, even if a user has not requested that a static URL of a corresponding single page application be loaded and executed in the browser. Consequently, an initial access to a static URL can be handled locally by the service worker and an application controller invoked by the service worker.

In another example, dynamic URLs (e.g., dynamic route paths) can be loaded into the routing table in association with an initial access to its corresponding page in the root directory. That is, when a request for a URL that is associated with a dynamic route path is received for the first time, the service worker allows the request go to a network server because there is no matching entry for the dynamic route path in the routing table (e.g., a cache miss). The network server stores user-driven settings defining a single page application to which the dynamic route path refers. The network server is configured to respond to the request and a header in the response maps a dynamic URL to an identification of a single page application. The service worker intercepts this response and adds an entry to the routing table so that subsequent requests for the dynamic URL can be handled locally by the service worker and the invoked application controller.

Consequently, the service worker disclosed herein is an orchestrator of multiple application controllers that each serve a customized application experience. The service worker proxies various life cycle events (e.g., install, activate, etc.) against the registered application controllers, and orchestrates the performance of the life cycle events by relying on entries in a routing table that identify the appropriate single page application. Unlike traditional single page application systems which provide a strict one-to-one association between a service worker and a single page application, the disclosed service worker can simultaneously serve multiple single page applications (e.g., implement one-to-N associations). This alleviates the need to unregister a source service worker and register a target service worker which severely affects the performance of a computing system. Once loaded, the service worker disclosed herein can be persisted across application boundaries, yet within a defined root scope, thereby allowing resources to be shared by multiple single page applications and/or application controllers in an effective and efficient manner. This improves subsequent load times of web content and allows a seamless end-user experience.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 7 is a computer architecture diagram illustrating an illustrative computer hardware and software architecture for a computing system capable of implementing aspects of the techniques and technologies presented herein.

FIG. 8 is a diagram illustrating a distributed computing environment capable of implementing aspects of the techniques and technologies presented herein.

DETAILED DESCRIPTION

The following Detailed Description discloses techniques and technologies for implementing a service worker capable of serving multiple single page applications (SPAs) that are hosted in the same uniform resource locator (URL) space (e.g., a domain within which the SPAs are hosted). Accordingly, the defined scope of the service worker is no longer bound by only one SPA, but rather by a root directory of a web site that hosts multiple SPAs. Since the service worker described herein serves multiple SPAs, the service worker implements an approach to ensure that a correct application controller corresponding to the SPA that hosts a URL is invoked. To do this, the service worker is configured to leverage a router and a routing table to associate a URL included in a request from a browser with the correct application controller corresponding to the SPA that hosts the URL for which the request is sent.

In various examples, the URL can be a dynamic URL that can be associated with different ones of the single page applications served by the service worker, in accordance with user-driven settings defined in tenant accounts. Moreover, within a particular tenant organization, a dynamic URL can change the page to which it refers over time. Accordingly, the URL space to which the multiple SPAs belong may be referred to herein as a dynamic URL space at least because it includes one or more dynamic URLs. In other examples described herein, the URL can be a static URL that is associated with that same single page application, regardless of any user-driven settings defined in tenant accounts.

Various examples, scenarios, and aspects of the disclosed techniques are described below with reference to FIGS. 1-8.

Figure 1:
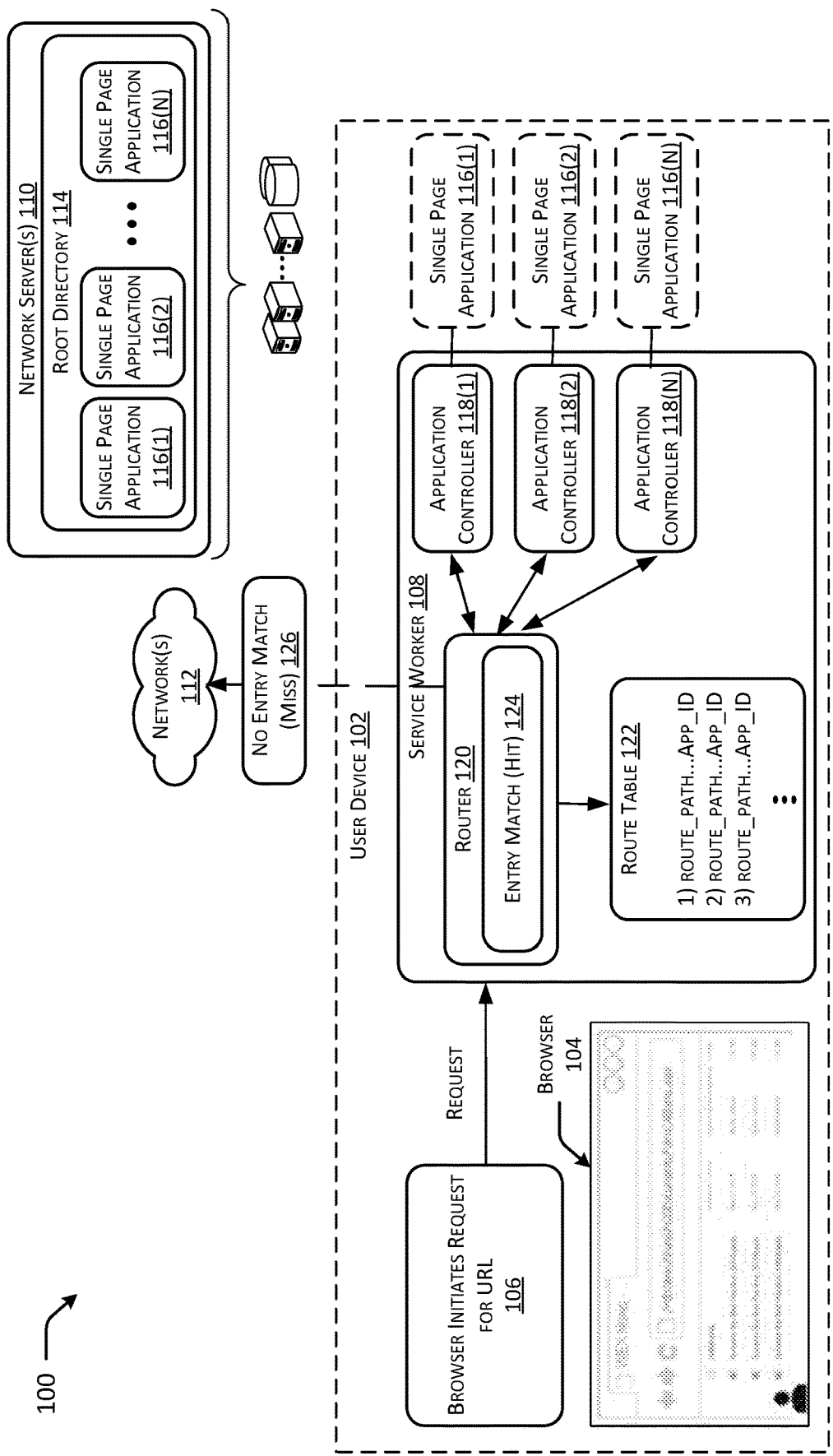
FIG. 1 is a diagram illustrating an example environment in which a service worker is configured to serve multiple single page applications (SPAs) that are hosted in the same uniform resource locator (URL) space (e.g., a domain within which the SPAs are hosted).

FIG. 1 is a diagram illustrating an example environment 100 in which a service worker is configured to serve multiple single page applications (SPAs) that are hosted in the same uniform resource locator (URL) space (e.g., a domain within which the SPAs are hosted). As shown in FIG. 1, a user device 102 is executing a browser 104 displaying a web page in a window and/or a tab. As part of the execution, the browser 104 is configured to initiate a request for a URL that corresponds to the displayed web page, as referenced by 106.

A user device 102 can include, but is not limited to, a desktop computer, a game console and/or a gaming device, a tablet computer, a personal data assistant (PDA), a mobile phone/tablet hybrid, a laptop computer, a telecommunication device, a wearable device, a work station, an augmented or virtual reality device, an Internet-of-Things (IoT) device, an embedded device, or any other sort of computing device configured to use a browsing component to display a web page.

A service worker 108 that is configured on the user device 102, and that is positioned between the browser 104 and network server(s) 110 which can be accessed by the user device 102 via network(s) 112, intercepts this request. The service worker 108 is a script that the browser 104 executes in the background, separate from a thread that executes the displayed web page. The defined scope of the service worker 108 is a root directory 114 of a web site (e.g., 'www.contoso.com') that hosts multiple single page applications 116 (1-N) (where N is a positive number such as 2, 3, 5, 10, etc.). For example, a single page application can be a calendar application, a mail application, a search application, a lists application, and so forth.

Each of the multiple single page applications 116(1-N) is associated with its own application controller 118(1-N) installed on the user device 102. Via the use of the application controllers 118(1-N), the single page applications 116(1-N) have the capability to define their own offline experience (e.g., a boot sequence) without having to access or receive files and/or instructions from the network server(s) 110 via an established connection over network(s) 112.

The application controllers 118(1-N) are each configured to manage service worker life cycles and provide various operations based on the life cycles. Since the service worker 108 serves multiple single page applications 116(1-N), the service worker 108 implements an approach to ensure that a correct application controller corresponding to the single page application that hosts a URL is invoked. To do this, the service worker 108 is configured to leverage a router 120 and a routing table 122 to associate a URL included in a request from the browser, as referenced by 106, with the correct application controller corresponding to the single page application that hosts the URL of the web page for which the request is sent.

After the service worker 108 intercepts the request, the router 120 is configured to identify a URL that provides a basis for a search of the routing table 122. The routing table 122 includes different entries that associate a URL, or a portion of a URL, with an identification of one of the single page applications 116(1-N). Accordingly, the router 120 is configured to determine whether a match exists between the URL associated with the request and a URL listed in an entry of the routing table 122. In various examples, the match is based on a route path, which is a URL relative to a host name with the query string removed. In other words, the route path is the remaining portion of the URL after the host name and the query string are removed. Thus, if the URL is 'www.contoso.com/site1/page2/query string', then the route path would be 'site1/page2'.

Using route paths, rather than whole URLs, optimizes the process for determining matches and reduces the chance of error as the server worker 108 is able to compare shorter strings. The route path is normalized (e.g., includes only lower case letters) to ensure effective and efficient matching. In the case of an entry match 124 (e.g., a cache hit), the service worker 108 is configured to use the matching entry to identify one of the single page application 116(1-N) to which the route path refers. For instance, the URL associated with the request may be associated with single page application 116(1), and thus, the entry match reveals an identification of the single page application 116(1). Using the identification, the service worker 108 invokes a corresponding application controller 118(1) for the single page application 116(1). That is, the service worker 108 orchestrates or triggers performance of an event based on the request by calling on the application controller 118(1).

In the case of no entry match 126 (e.g., a cache miss), the service worker 108 does not further interfere with the request and lets the request go to the network server(s) 110 for handling, as further described herein.

Figure 2:
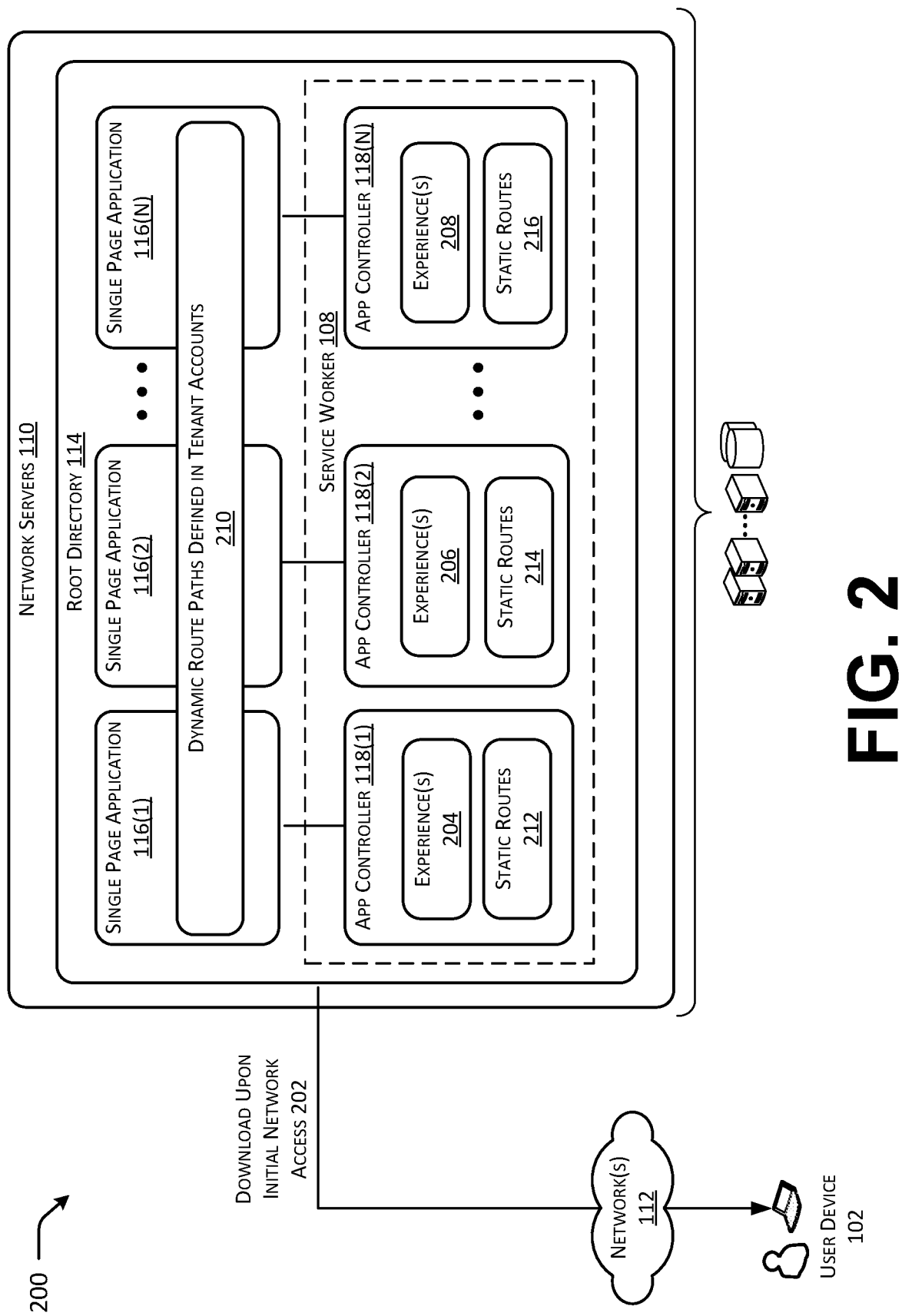
FIG. 2 is a diagram illustrating an example environment in which a service worker and application controllers corresponding to single page applications served by the service worker are downloaded and installed on a user device.

FIG. 2 is a diagram illustrating an example environment 200 in which the service worker 108 and application controllers 118(1-N) corresponding to single page applications 116(1-N) served by the service worker 108 initially reside on the network server(s) 110 but are downloaded and installed on the user device 102 over network(s) 112.

The browser of the user device 102 is configured to download and/or install the service worker 108, as well as the application controllers 118(1-N) and other data (e.g., files) for the single page applications 116(1-N) upon an initial network access 202 to a web page (e.g., a home page or welcome page) hosted within the root directory 114. The root directory 112 defines the scope for the service worker 108.

FIG. 2 illustrates that each of the application controllers 118(1-N) defines its own offline experience 204, 206, 208. For instance, an offline experience 204, 206, 208 can include a boot sequence for a single page application, which can be implemented without having to access or receive files from the network server(s) 110 once the service worker 108 and the application controllers 118(1-N) are downloaded to the user device 102. Providing developers of a single page application with the flexibility to control offline scenarios is important because different single page applications may handle the loading and/or syncing of content differently in order to optimize a user experience. Accordingly, while the service worker 108 is configured to serve multiple single page applications 116(1-N), the service worker 108 enables different experiences 204, 206, 208 to be executed via separate application controllers 118(1-N) associated with the single page applications 116(1-N).

A URL can be a dynamic URL that can be associated with different ones of the single page applications 116(1-N) served by the service worker 108, in accordance with user-driven settings that define dynamic URLs and/or route paths in tenant accounts 210. That is, a setting associates a dynamic URL with one of the single page applications 116(1-N). A URL can alternatively be a static URL that is associated with that same single page application, regardless of any user-driven settings. In other words, the association between a static URL and a single page application is the same across the tenant accounts (e.g., there is no user control aspect with regard to which SPA a URL refers).

There are various ways in which the service worker 108, once installed and registered on the user device 102, populates the routing table 122 in FIG. 1 with entries. For example, static route paths 212, 214, 216 are part of the application controllers 118(1-N) and can be loaded into the routing table 122 when the application controllers 118(1-N) are downloaded to the user device 102 and/or installed on the user device 102. The application controllers 118(1-N) can include a property that defines the static route paths 212, 214, 216. Since the pages to which static URLs refer are consistent across tenant accounts (i.e., they are not driven by user or tenant defined settings), entries based on these static URLs can be added to the routing table 122 immediately, even if a user has not requested that a static URL be loaded and executed in the browser. Consequently, an initial access to a static URL results in an entry match (e.g., a cache hit) and can be handled locally by the service worker 108 that has been downloaded to the user device 102.

In contrast, dynamic URLs (e.g., dynamic route paths) are loaded into the routing table 122 in association with an initial access to its corresponding page in the root directory 114. When a request for a URL that is associated with a dynamic route path is received for the first time by the service worker 108 executing on the user device 102, the service worker 108 allows the request go to the network server(s) 110 because there is no matching entry for the dynamic route path in the routing table 122 (e.g., a cache miss). The network server(s) 110 are able to determine the association between a dynamic route path and an identification of a single page application by checking the settings defined in a tenant account. The network server(s) 110 are configured to respond to the request and a header in the response maps a dynamic URL to the identification of the single page application. The service worker 108 executing on the user device 102 intercepts this response and adds an entry to the routing table 122 so that subsequent requests for the same dynamic URL being executed by the browser can be handled locally by the service worker 108.

Consequently, the service worker 108 executing on the user device 102 is an orchestrator of multiple application controllers that each serve a customized offline application experience. The service worker proxies various life cycle events (e.g., install, activate, etc.) against the registered application controllers, and orchestrates the performance of the life cycle events by relying on entries in a routing table that identify the appropriate single page application. Unlike traditional single page application systems, the disclosed service worker can simultaneously serve multiple single page applications. Once loaded, the service worker can be persisted across application boundaries, yet within a defined root scope, thereby allowing resources to be shared by multiple single page applications in an effective and efficient manner. This improves subsequent load times of web content and allows a seamless end-user experience.

Figure 3:
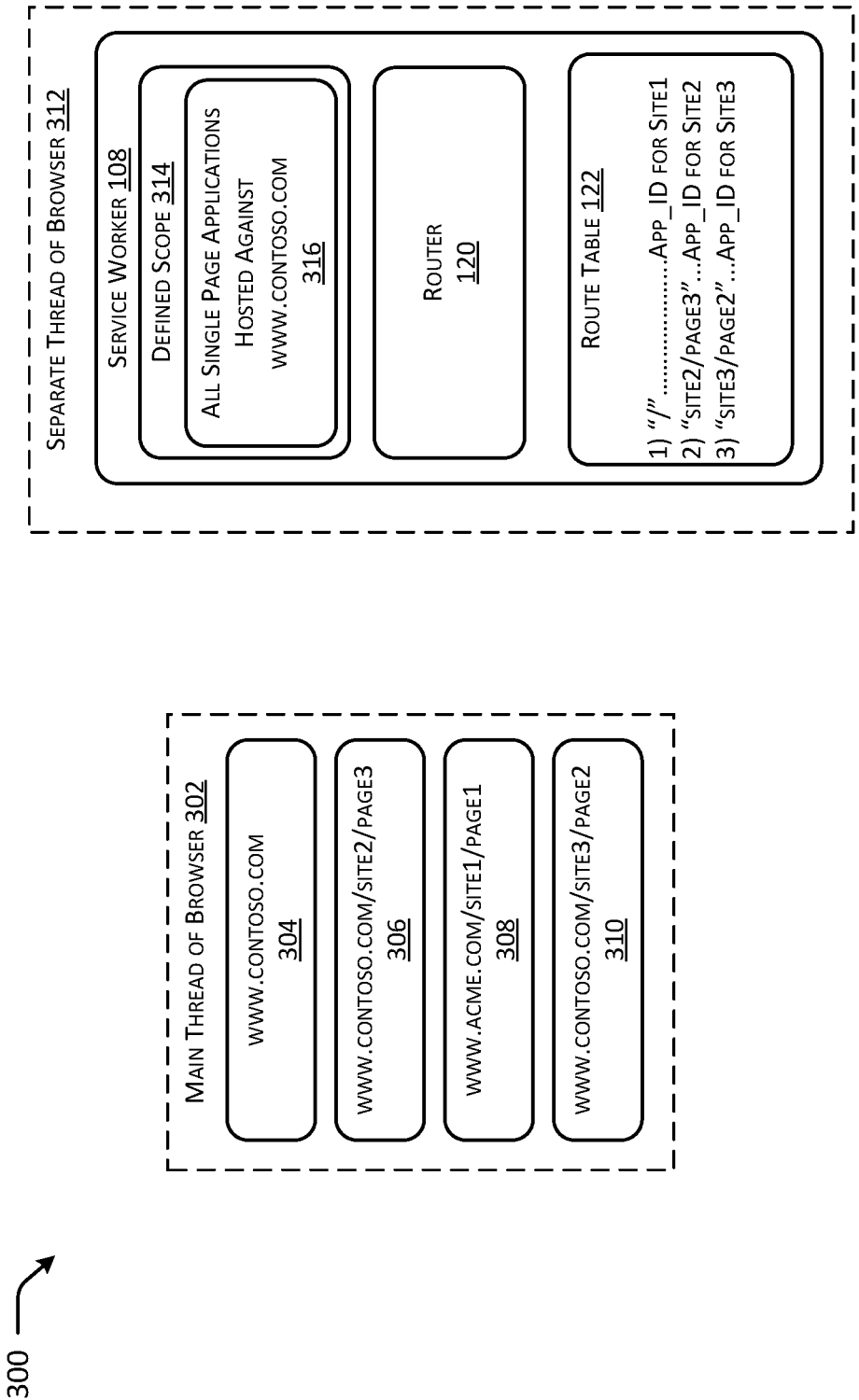
FIG. 3 is a diagram illustrating an example of how a service worker is configured to match a route path of a requested URL with a route path of an entry in a routing table, and to use the entry to determine a single page application to which the requested URL refers.

FIG. 3 is a diagram 300 illustrating an example of how a service worker is configured to match a route path of a requested URL with a route path of an entry in a routing table, and to use the entry to determine a single page application to which the requested URL refers. FIG. 3 illustrates a main thread 302 being executed by a browser of a user device. The main thread is displaying four web pages in four different windows and/or tabs. A first web page includes 'www.contoso.com' 304, a second web page includes 'www.contoso.com/site2/page3' 306, a third web page includes 'www.acme.com/site1/page1' 308, and a fourth web page includes 'www.contoso.com/site3/page2' 310. FIG. 3 further illustrates a separate thread 312 in which the browser executes the service worker 108.

As previously described, in at least one example, the defined scope 314 of the service worker is all the single page applications hosted against a root directory for a web site, such as 'www.contoso.com' 316. In this example, at least some of these single page applications include "site1", "site2', and "site3", and these single page applications can each include multiple different pages.

The service worker 108 is configured to intercept requests for URLs 304, 306, 308, 310 displayed in the browser and determine if the request is within its scope. Accordingly, the service worker 108 is configured to handle requests for 'www.contoso.com' 304, 'www.contoso.com/site2/page3'

306, and 'www.contoso.com/site3/page2' 310, since they are within its scope. However, the service worker 108 is not configured to handle requests for 'www.acme.com/site1/page1' 308 since this web page is not within its scope.

After the service worker 108 determines a request is within its boundaries based on the defined scope 314, the router 120 checks the routing table 122 for a match. In the example of FIG. 3, the routing table 122 includes a first entry which associates the root (P) route path for the URL 'www.contoso.com' 304 with an application identification for the SPA "site1". The routing table 122 includes a second entry which associates the route path "site2/page3" for the URL 'www.contoso.com/site2/page3' 306 with an application identification for the SPA "site2". The routing table 122 includes a third entry which associates the route path "site3/page2" for the URL 'www.contoso.com/site3/page2' 310 with an application identification for the SPA "site3".

These entries, in case of a match (e.g., a hit), are used to identify single page applications to which the requests correspond. As described above, route paths in the entries can be dynamic route paths (e.g., the root '/' may be configured to access SPAs for 'site1', 'site2', or 'site3') or static route paths (e.g., 'site2/page3' may only be configured to access the SPA for 'site2').

In various examples, the service worker 108 may be able to implement pattern matching within dynamic route paths to increase the match rate, or the cache hit rate, in case there is not an exact match for the whole route path. The pattern matching can use one or more segments as a predicate to increase the match rate. This ultimately conserves resources (e.g., networking resources) and reduces latency because a request does not need to be handled by the network servers. For example, if the 'site1' single page application within 'www.contoso.com' hosts 'page1' and 'page2', and the user has already visited 'www.contoso.com/site1/page1' and then the user visits 'www.contoso.com/site1/page2', the service worker 108 can use pattern matching of one or more segments (e.g., 'site1') in the two route paths (e.g., 'site1/page1' and 'site1/page2') to determine that 'www.contoso.com/site1/page2' is also associated with the 'site1' single page application. This allows the application controller to be invoked locally without having to go to the network.

Figure 4:
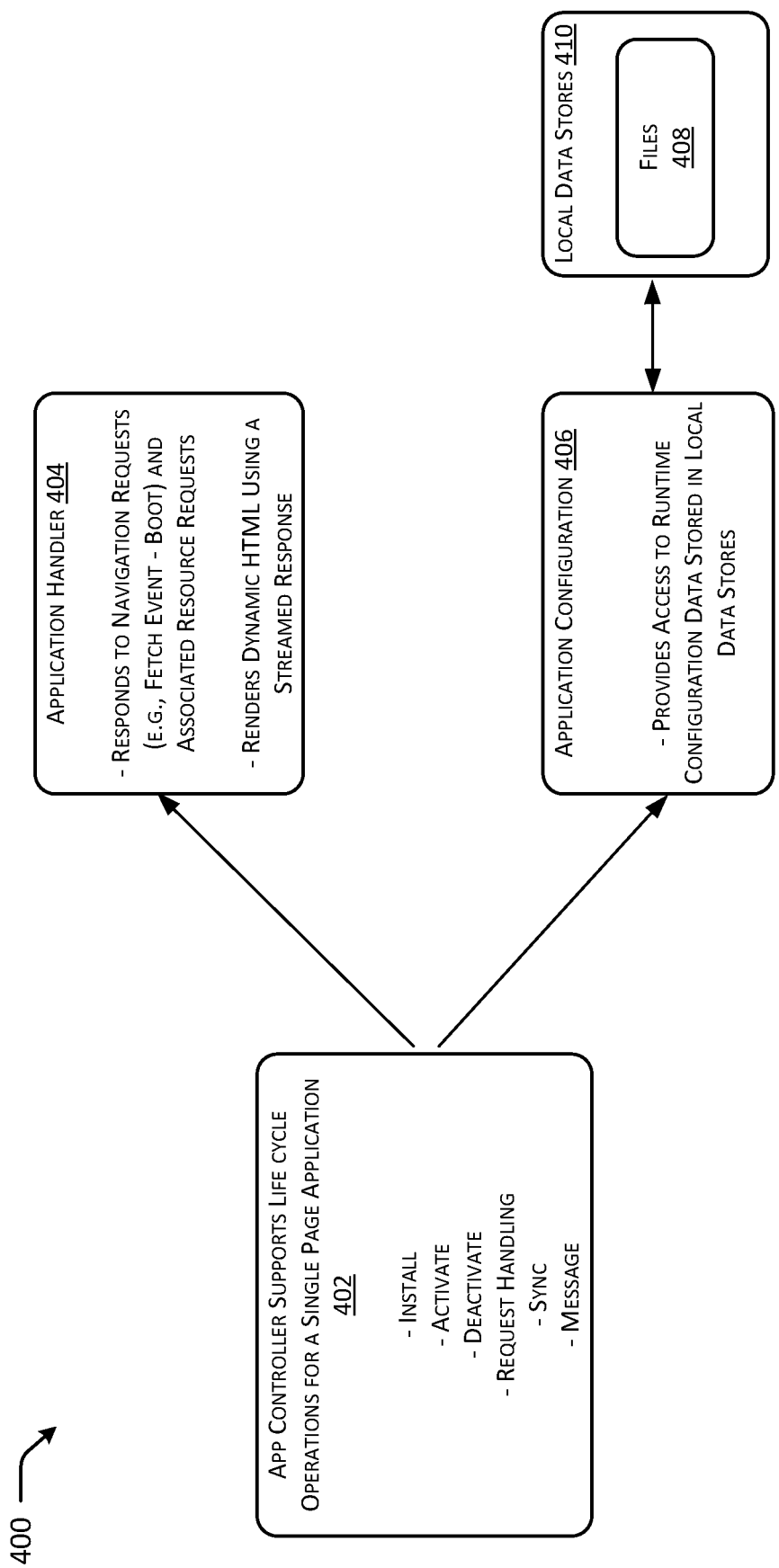
FIG. 4 is a diagram that illustrates components used by an application controller to perform life cycle operations.

FIG. 4 is a diagram 400 that illustrates components used by an application controller 402 to manage and perform life cycle operations for a single page application. Example life cycle operations can include an install operation, an activate operation, a deactivate operation, a request handling operation, a sync operation, a message operation, and so forth. In some embodiments, the application controller 402 calls on an application handler 404 to respond to a navigation request, such as a fetch event, and/or other resource requests. In some embodiments, the application controller 402 calls on an application handler 404 to render dynamic HTML using a streamed response. In some embodiments, the application controller calls on an application configuration 406 to provide access to runtime configuration data stored in files 408 of local data stores 410.

Figure 5:
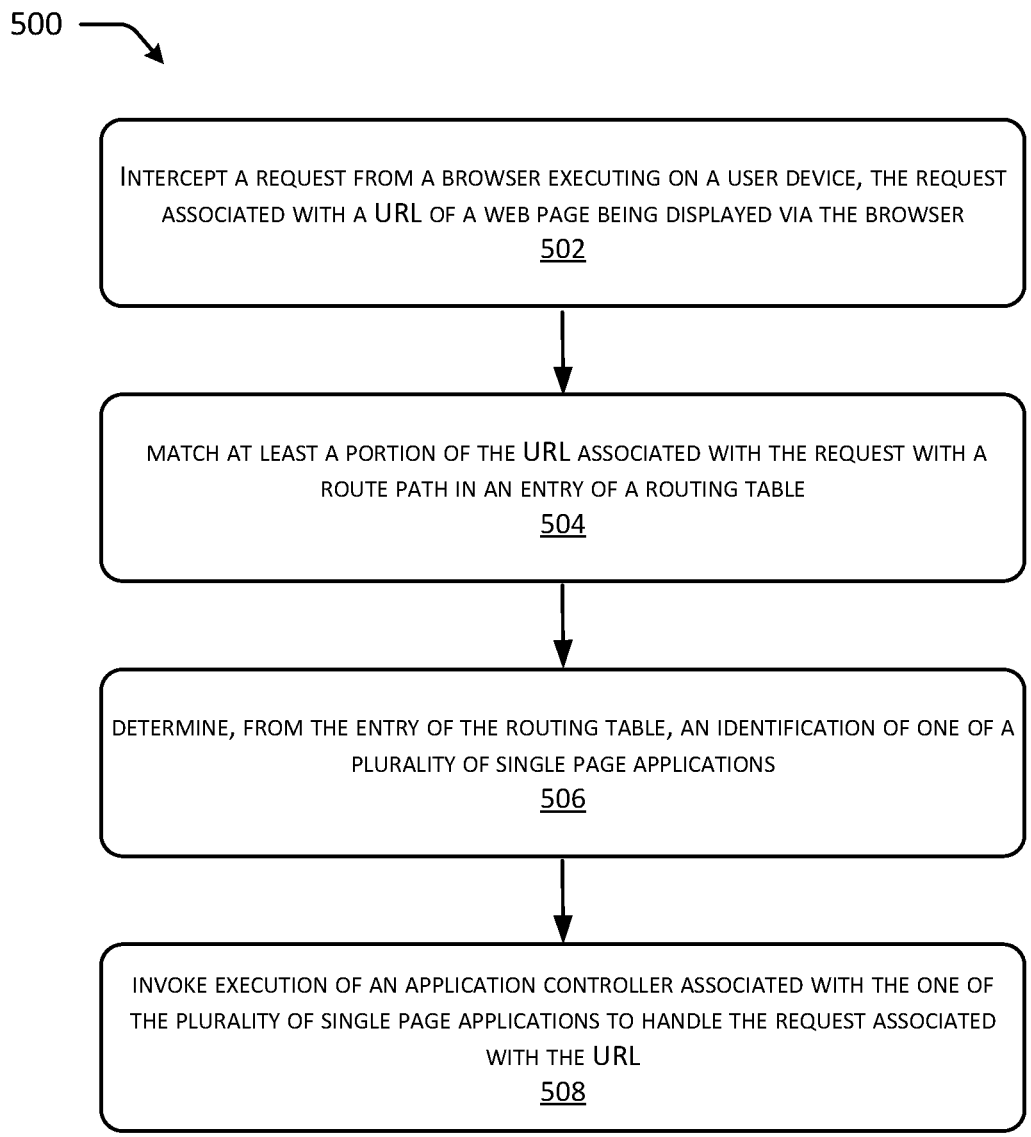
FIG. 5 is a flow diagram of an example method for a service worker to serve multiple single page applications (SPAs) that are hosted in the same uniform resource locator (URL) space (e.g., a domain within which the SPAs are hosted).

FIG. 5 represents an example process in accordance with various examples from the description of FIGS. 1-4. The example operations shown in FIG. 5 can be implemented on or otherwise embodied in a user device 102, or other type of device, via a service worker.

The order in which the operations are described is not intended to be construed as a limitation, and any number of the described operations can be combined in any order and/or in parallel to implement the process. Moreover, the operations in FIG. 5 can be implemented in hardware, software, and/or a combination thereof. In the context of software, the operations represent computer-executable instructions that, when executed by one or more processing units, cause one or more processing units to perform the recited operations. For example, modules and components described herein can be stored in a computer-readable media and executed by at least one processing unit to perform the described operations.

FIG. 5 is a flow diagram of an example method 500 for a service worker to serve multiple single page applications (SPAs) that are hosted in the same uniform resource locator (URL) space (e.g., a domain within which the SPAs are hosted).

At operation 502, a request from a browser executing on a user device is intercepted. The request is associated with a URL of a web page being displayed via a browser. At operation 504, at least a portion of the URL associated with the request is matched with a route path in an entry of a routing table. At operation 506, an identification of one of a plurality of single page applications is determined from the entry of the routing table. At operation 508, execution of an application controller associated with the one of the plurality of single page applications is invoked to handle the request associated with the URL.

Figure 6:
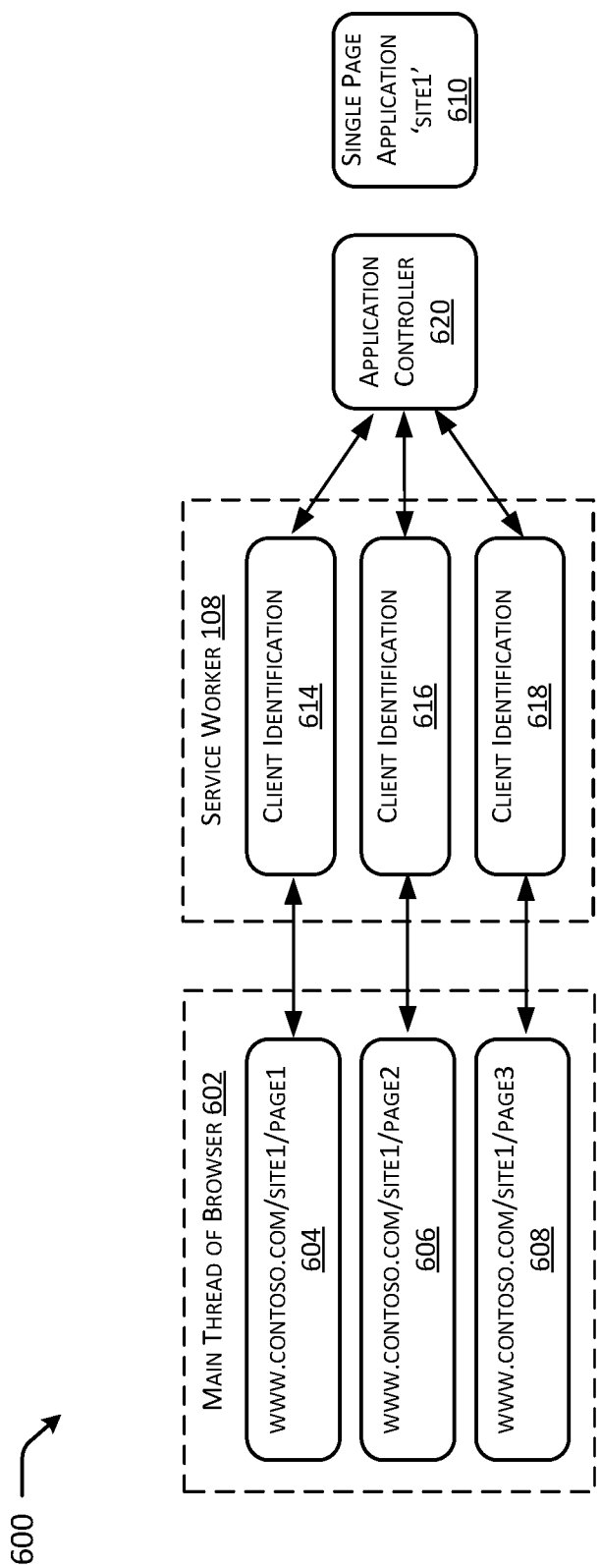
FIG. 6 is a diagram that illustrates the use of client identifications to associate a single page application with one of multiple web pages, hosted by the single page applications, which are currently being displayed in different tabs or windows by the browser.

FIG. 6 is a diagram 600 that illustrates the use of client identifications to associate a single page application with different ones of multiple web pages, hosted by the single page applications, which are currently being displayed in different tabs or windows by the browser. In other words, client identifications can be used when multiple instances (e.g., different URLs) of the same single page application are being executed via the browser.

As illustrated, a main thread of a browser 602 is displaying web pages for 'www.contoso.com/site1/page1' 604, 'www.contoso.com/site1/page2' 606, and 'www.contoso.com/site1/page3' 608. Each of these URLs are hosted by the same single page application 610 ('site1').

Consequently, upon a first navigation request for each URL 604, 606, 608, the service worker 108 can assign client identifications 614, 616, 618 to the URLs 604, 606, 608, so that messages from each URL 604, 606, 608 executing in the browser can be mapped to the correct application controller 620, and so that resources can be appropriately provisioned to the different URLs 604, 606, 608 of the single page application 610. The routing table can be populated with these client identifications 614, 616, 618.

FIG. 7 shows additional details of an example computer architecture 700 for a device capable of executing computer instructions (e.g., the service worker described herein). The computer architecture 700 illustrated in FIG. 7 includes processing unit(s) 702, a system memory 704, including a random access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (AS SPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 508. The computer architecture 700 further includes a mass storage device 712 for storing an operating system 714, application(s) 716 (e.g., a browser), components 718 (e.g., a service worker, etc.), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network(s) 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

Network(s) 720 can include, for example, public networks such as the Internet, private networks such as an institutional and/or personal intranet, or some combination of private and public networks. Network(s) 720 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 720 can utilize communications protocols, including packet-based and/or datagram-based protocols such as internet protocol (IP), transmission control protocol (TCP), user datagram protocol (UDP), or other types of protocols. Moreover, network(s) 720 can also include a number of devices that facilitate network communications and/or form a hardware basis for the networks, such as switches, routers, gateways, access points, firewalls, base stations, repeaters, backbone devices, and the like.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

FIG. 8 depicts an illustrative distributed computing environment 800 within which the techniques described herein can be implemented. For example, the distributed computing environment 800 can includes resources that can provide a service to user devices.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or social networking services 822. As shown in FIG. 8, the servers 808 also can host other services, applications, portals, and/or other resources ("other resources") 824. Such services may include single page applications configured to render and display web pages via a browser.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a computer-implemented method for a service worker to serve a plurality of single page applications hosted in a dynamic uniform resource locator (URL) space, comprising: intercepting, by the service worker, a request from a browser executing on a user device, the request associated with a URL of a web page being displayed via the browser; matching at least a portion of the URL associated with the request with a route path in an entry of a routing table; determining, from the entry of the routing table, an identification of one of the plurality of single page applications served by the service worker; and invoking execution of an application controller associated with the one of the plurality of single page applications to handle the request associated with the URL.

Example Clause B, the computer-implemented method of Example Clause A, wherein: the application controller is configured to manage life cycle operations for the one of the plurality of single page applications; and the life cycle operations comprise one or more of an install operation, an activate operation, a request handling operation, a sync operation, or a message operation.

Example Clause C, the computer-implemented method of Example Clause A or Example Clause B, wherein the application controller is configured to handle the request in accordance with an experience defined by the one of the plurality of single page applications.

Example Clause D, the computer-implemented method of any one of Example Clauses A through C, wherein the application controller is executed separately from other application controllers associated with other ones of the plurality of single page applications.

Example Clause E, the computer-implemented method of any one of Example Clauses A through D, wherein the route path comprises a static route path and the method further comprises: installing the service worker and the application controller prior to intercepting the request; and populating the routing table with the entry that includes the static route path in accordance with a property defined in the application controller upon installation of the service worker and the application controller.

Example Clause F, the computer-implemented method of any one of Example Clauses A through D, wherein the route path comprises a dynamic route path configurable to access different ones of the plurality of single page applications in accordance with settings defined by tenants of a cloud-based platform hosting the plurality of single page applications.

Example Clause G, the computer-implemented method of Example Clause F, further comprising populating the routing table with the entry that includes the dynamic route path based on an intercepted response from a network server when the URL is initially accessed by the browser, wherein a header of the intercepted response maps the dynamic route path to the identification of the one of the plurality of single page applications.

Example Clause H, the computer-implemented method of any one of Example Clauses A through G, wherein a scope defined for the service worker comprises a root directory for a web site that includes the dynamic URL space.

Example Clause I, the computer-implemented method of any one of Example Clauses A through H, wherein the matching of at least the portion of the URL associated with the request with the route path in the entry of the routing table comprises pattern matching of one or more path segments.

Example Clause J, the computer-implemented method of any one of Example Clauses A through I, further comprising: assigning a plurality of client identifications to a plurality of instances of the one of the plurality single page applications executing in the browser; and populating the routing table with the plurality of client identifications to enable messages to be routed, by the service worker, between the plurality of instances of the one of the plurality single page applications executing in the browser and the application controller.

Example Clause K, a device for a service worker to serve a plurality of single page applications hosted in a dynamic uniform resource locator (URL) space, comprising: one or more processing units; and computer-readable storage media storing instructions that, when executed by the one or more processing units, cause the device to perform operations comprising: intercepting a request from a browser executing on a user device, the request associated with a URL of a web page being displayed via the browser; matching at least a portion of the URL associated with the request with a route path in an entry of a routing table; determining, from the entry of the routing table, an identification of one of the plurality of single page applications; and invoking execution of an application controller associated with the one of the plurality of single page applications to handle the request associated with the URL.

Example Clause L, the device of Example Clause K, wherein the application controller is configured to handle the request in accordance with an experience defined by the one of the plurality of single page applications.

Example Clause M, the device of Example Clause K or Example Clause L, wherein the application controller is executed separately from other application controllers associated with other ones of the plurality of single page applications.

Example Clause N, the device of any one of Example Clauses K through M, wherein the route path comprises a static route path and the operations further comprise: installing the application controller prior to intercepting the request; and populating the routing table with the entry that includes the static route path in accordance with a property defined in the application controller upon installation of the application controller.

Example Clause O, the device of any one of Example Clauses K through M, wherein the route path comprises a dynamic route path configurable to access different ones of the plurality of single page applications in accordance with settings defined by tenants of a cloud-based platform hosting the plurality of single page applications.

Example Clause P, the device of Example Clause O, wherein the operations further comprise populating the routing table with the entry that includes the dynamic route path based on an intercepted response from a network server when the URL is initially accessed by the browser, wherein a header of the intercepted response maps the dynamic route path to the identification of the one of the plurality of single page applications.

Example Clause Q, the device of any one of Example Clauses K through P, wherein the operations are performed by the server worker and a scope defined for the service worker comprises a root directory for a web site that includes the dynamic URL space.

Example Clause R, the device of any one of Example Clauses K through Q, wherein the matching of at least the portion of the URL associated with the request with the route path in the entry of the routing table comprises pattern matching of one or more path segments.

Example Clause S, the device of any one of Example Clauses K through R, wherein the operations further comprise: assigning a plurality of client identifications to a plurality of instances of the one of the plurality single page applications executing in the browser; and populating the routing table with the plurality of client identifications to enable messages to be routed, by the service worker, between the plurality of instances of the one of the plurality single page applications executing in the browser and the application controller.

Example Clause T, a computer readable storage medium that stores instructions that, when executed by one or more processing units, cause a device to perform operations comprising: intercepting a request from a browser executing on a user device, the request associated with a URL of a web page being displayed via the browser; matching at least a portion of the URL associated with the request with a route path in an entry of a routing table; determining, from the entry of the routing table, an identification of one of the plurality of single page applications; and invoking execution of an application controller associated with the one of the plurality of single page applications to handle the request associated with the URL.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different single page applications, two different operations, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A computer-implemented method for a service worker to serve a plurality of single page applications hosted in a dynamic uniform resource locator (URL) space, comprising:
    installing the service worker and an application controller associated with a single page application, of the plurality of single page applications served by the service worker, wherein each of the plurality of single page applications has an associated application controller;

populating a routing table with an entry that includes a static route path in accordance with a property defined in the application controller upon installation of the service worker and the application controller;

subsequent to installing the service worker and populating the routing table with the entry, intercepting, by the service worker, a request from a browser executing on a user device, the request associated with a URL of a web page being displayed via the browser;

matching at least a portion of the URL associated with the request with the static route path included in the entry of the routing table;

determining, from the entry of the routing table, an identification of the single page application; and invoking execution of the application controller associated with the single page application to handle the request associated with the URL.

2. The computer-implemented method of claim 1, wherein:
the application controller is configured to manage life cycle operations for the single page application; and
the life cycle operations comprise one or more of an install operation, an activate operation, a request handling operation, a sync operation, or a message operation.

3. The computer-implemented method of claim 1, wherein the application controller is configured to handle the request in accordance with an experience defined by the single page application.

4. The computer-implemented method of claim 1, wherein the application controller is executed separately from other application controllers associated with other ones of the plurality of single page applications.

5. The computer-implemented method of claim 1, wherein a scope defined for the service worker comprises a root directory for a web site that includes the dynamic URL space.

6. The computer-implemented method of claim 1, wherein the matching of at least the portion of the URL associated with the request with the stack route path included in the entry of the routing table comprises pattern matching of one or more path segments.

7. The computer-implemented method of claim 1, further comprising:
assigning a plurality of client identifications to a plurality of instances of the single page application executing in the browser; and
populating the routing table with the plurality of client identifications to enable messages to be routed, by the service worker, between the plurality of instances of the single page application executing in the browser and the application controller.

8. A device for a service worker to serve a plurality of single page applications hosted in a dynamic uniform resource locator (URL) space, comprising:
one or more processing units; and
computer-readable storage media storing instructions that, when executed by the one or more processing units, cause the device to perform operations comprising:
intercepting a request from a browser executing on a user device, the request associated with a URL of a web page being displayed via the browser;
matching at least a portion of the URL associated with the request with a route path in an entry of a routing table, wherein the route path comprises a dynamic route path configurable to access different ones of the plurality of single page applications in accordance with settings defined by tenants of a cloud-based platform hosting the plurality of single page applications;
determining, from the entry of the routing table, an identification of one of the plurality of single page applications; and
invoking execution of an application controller associated with the one of the plurality of single page applications to handle the request associated with the URL, wherein each of the plurality of single page applications has an associated application controller.

9. The device of claim 8, wherein the application controller is configured to handle the request in accordance with an experience defined by the one of the plurality of single page applications.

10. The device of claim 8, wherein the application controller is executed separately from other application controllers associated with other ones of the plurality of single page applications.

11. The device of claim 8, wherein the operations further comprise populating the routing table with the entry that includes the dynamic route path based on an intercepted response from a network server when the URL is initially accessed by the browser, wherein a header of the intercepted response maps the dynamic route path to the identification of the one of the plurality of single page applications.

12. The device of claim 8, wherein the operations are performed by the server worker and a scope defined for the service worker comprises a root directory for a web site that includes the dynamic URL space.

13. The device of claim 8, wherein the matching of at least the portion of the URL associated with the request with the route path in the entry of the routing table comprises pattern matching of one or more path segments.

14. The device of claim 8, wherein the operations further comprise:
assigning a plurality of client identifications to a plurality of instances of the one of the plurality single page applications executing in the browser; and
populating the routing table with the plurality of client identifications to enable messages to be routed, by the service worker, between the plurality of instances of the one of the plurality single page applications executing in the browser and the application controller.

15. A computer readable storage medium that stores instructions that, when executed by one or more processing units, cause a device to perform operations comprising:
assigning a plurality of client identifications to a plurality of instances of a single page application executing in a browser of the device; and
populating a routing table with the plurality of client identifications to enable messages to be routed, by a service worker, between the plurality of instances of the single page application and an application controller associated with the single page application;
intercepting a request from the browser, the request associated with a URL of a web page being displayed via the browser;
matching at least a portion of the URL associated with the request with a route path in an entry of a routing table;
determining, from the entry of the routing table, a client identification of the plurality of client identifications; and
invoking execution of the application controller associated with the single page application to handle the request associated with the URL based on the client identification determined from the entry of the routing table.

\* \* \* \* \*